US011119269B2

(12) United States Patent
Liu

(10) Patent No.: US 11,119,269 B2
(45) Date of Patent: Sep. 14, 2021

(54) LAMP PANEL ASSEMBLY AND DISPLAY DEVICE

(71) Applicant: Wuhan China Star Optoelectronics Technology Co., Ltd., Hubei (CN)

(72) Inventor: Fancheng Liu, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 16/623,368

(22) PCT Filed: Oct. 29, 2019

(86) PCT No.: PCT/CN2019/114065
§ 371 (c)(1),
(2) Date: Dec. 16, 2019

(87) PCT Pub. No.: WO2020/258623
PCT Pub. Date: Dec. 30, 2020

(65) Prior Publication Data
US 2020/0408980 A1   Dec. 31, 2020

(30) Foreign Application Priority Data
Jun. 27, 2019  (CN) .......................... 201910566093.7

(51) Int. Cl.
*F21V 8/00*  (2006.01)
(52) U.S. Cl.
CPC ............. *G02B 6/008* (2013.01); *G02B 6/005* (2013.01); *G02B 6/0088* (2013.01)

(58) Field of Classification Search
CPC ...... G02B 6/008; G02B 6/005; G02B 6/0088; G02B 6/0078
See application file for complete search history.

(56) References Cited

U.S. PATENT DOCUMENTS

| 2009/0303410 A1* | 12/2009 | Murata ................. G02B 6/002 349/58 |
| 2010/0232178 A1* | 9/2010 | Wu ........................ G02B 6/008 362/607 |
| 2017/0207284 A1 | 7/2017 | Dykaar |

FOREIGN PATENT DOCUMENTS

| CN | 101131503 A | 2/2008 |
| CN | 201555185 U | 8/2010 |
| CN | 202171168 U | 3/2012 |
| CN | 205564183 U | 9/2016 |
| CN | 106097913 A | 11/2016 |
| CN | 106340256 A | 1/2017 |
| CN | 206322437 U | 7/2017 |
| CN | 206512969 U | 9/2017 |
| CN | 207213979 U | 4/2018 |
| CN | 109445186 A | 3/2019 |

\* cited by examiner

*Primary Examiner* — Anabel Ton

(57) ABSTRACT

The present disclosure provides a lamp panel assembly and a display device comprising the same. The lamp panel assembly includes a plurality of mutually spliced lamp panels. A connecting portion is formed between any two adjacent lamp panels and comprises a convex portion and a concave portion respectively disposed on the two adjacent lamp panels and fitted to each other.

18 Claims, 3 Drawing Sheets

LAMP PANEL ASSEMBLY AND DISPLAY DEVICE

FIELD OF INVENTION

The present disclosure relates to a field of display technology, and particularly to a lamp panel assembly and a display device comprising the same.

BACKGROUND

As a backlight source, compared to light emitting diode (LED) panels, mini LED panels have a larger number of smaller LEDs, thereby achieving a thinner display screen and improving local contrast. Mini LED panels meet industry's requirements for high contrast, brightness, surface fit, and durability.

Medium and large size mini LED panels can only be fabricated by splicing a plurality of mini LED panels, but the following problems will occur at joints of mini LED panels: warpage, unevenness, breakage, chopped light, and dark lines caused by cutting black edges.

Currently, large optic distance (OD) is usually used to solve the problems. However, as thicknesses of lamp panels become thinner, optical distances that can be reserved are more limited. Therefore, dark lines are formed at joints where lamp panels are spliced due to uneven light mixing.

Medium and large size mini LED panels can only be fabricated by splicing a plurality of mini LED panels, but the following problems usually occur at joints of mini LED panels: warpage, unevenness, breakage, chopped light, and dark lines caused by cutting black edges, resulting in uneven brightness of lamp panels.

SUMMARY OF DISCLOSURE

The present disclosure provides a lamp panel assembly and a display device comprising the same, wherein gaps at joints of lamp panels are reduced by setting a more stable lamp panel splicing structure, thereby solving the technical problem of warpage, breakage, and uneven light mixing at joints of lamp panels caused by instability of spliced lamp panels.

In order to solve the aforementioned problems, the present disclosure provides the following technical solutions.

The present disclosure provides a lamp panel assembly comprising a plurality of mutually spliced lamp panels. A connecting portion is formed between any two adjacent lamp panels and comprises a convex portion and a concave portion respectively disposed on the two adjacent lamp panels and fitted to each other.

In an embodiment, each of the lamp panels is provided with the convex portions and the concave portions.

In an embodiment, two opposite sides of each of the lamp panels are first connecting surfaces provided with the convex portions, and other two opposite sides of each of the lamp panels are second connecting surfaces provided with the concave portions.

In an embodiment, each of the lamp panels is provided with a light emitting surface connected to the first connecting surfaces and the second connecting surfaces. Each convex portion is disposed at an end of each first connecting surface away from the light emitting surfaces. Each concave portion is disposed at an end of each second connecting surface away from the light emitting surfaces.

In an embodiment, each convex portion is disposed at a middle portion of each first connecting surface and each concave portion is disposed at a middle portion of each second connecting surface.

In an embodiment, in each of the lamp panels, lengths of the convex portions in a direction parallel to the light emitting surface and the first connecting surfaces are equal to lengths of sides of the light emitting surface connected to the first connecting surface. Lengths of the concave portions in a direction parallel to the light emitting surface and the second connecting surfaces are equal to lengths of sides of the light emitting surface connected to the second connecting surface.

In an embodiment, lengths of the convex portions and the concave portions in a thickness direction of each lamp panel are less than a thickness of each lamp panel.

In an embodiment, a distance at which each convex portion protrudes outward from each first connecting surface is less than a distance at which each concave portion is recessed from each second connecting surface.

In an embodiment, the lamp panel assembly further comprises an outer frame in which the plurality of mutually spliced lamp panels are disposed. The lamp panels connected to the outer frame are external lamp panels. The same connecting portions are formed between the external lamp panels and the outer frame.

In an embodiment, surfaces of the convex portions contacted to the concave portions are coated with white ink.

In an embodiment, the convex portions are shaped as cuboids, beveled bodies, or combinations thereof The present disclosure further provides a display device comprising a backplate, a lamp panel assembly, an optical film, and a display screen. The lamp panel assembly, the optical film, and the display screen are disposed in sequence on the backplate. The lamp panel assembly comprises a plurality of mutually spliced lamp panels. A connecting portion is formed between any two adjacent lamp panels and comprises a convex portion and a concave portion respectively disposed on the adjacent two lamp panels and fitted to each other.

In an embodiment, each of the lamp panels is provided with the convex portions and the concave portions.

In an embodiment, two opposite sides of each of the lamp panels are first connecting surfaces provided with the convex portions, and other two opposite sides of each of the lamp panels are second connecting surfaces provided with the concave portions.

In an embodiment, each of the lamp panels is provided with a light emitting surface connected to the first connecting surfaces and the second connecting surfaces. Each convex portion is disposed at an end of each first connecting surface away from the light emitting surfaces. Each concave portion is disposed at an end of each second connecting surface away from the light emitting surfaces.

In an embodiment, each convex portion is disposed at a middle portion of each first connecting surface and each concave portion is disposed at a middle portion of each second connecting surface.

In an embodiment, in each of the lamp panels, lengths of the convex portions in a direction parallel to the light emitting surface and the first connecting surfaces are equal to lengths of sides of the light emitting surface connected to the first connecting surface. Lengths of the concave portions in a direction parallel to the light emitting surface and the second connecting surfaces are equal to lengths of sides of the light emitting surface connected to the second connecting surface.

In an embodiment, lengths of the convex portions and the concave portions in a thickness direction of each lamp panel are less than a thickness of each lamp panel.

In an embodiment, a distance at which each convex portion protrudes outward from each first connecting surface is less than a distance at which each concave portion is recessed from each second connecting surface.

In an embodiment, the lamp panel assembly further comprises an outer frame in which the plurality of mutually spliced lamp panels are disposed. The lamp panels connected to the outer frame are external lamp panels. The same connecting portions are formed between the external lamp panels and the outer frame.

In an embodiment, surfaces of the convex portions contacted to the concave portions are coated with white ink.

In an embodiment, the convex portions are shaped as cuboids, beveled bodies, or combinations thereof.

In order to solve the aforementioned technical problem, by providing convex portions and concave portions which can be stably connected to each other at joints of lamp panels, the present invention improves stability of the spliced lamp panels, reduces gaps at the joints of the lamp panels, and improves uneven brightness of the lamp panels.

DETAILED DESCRIPTION

Figure 1:
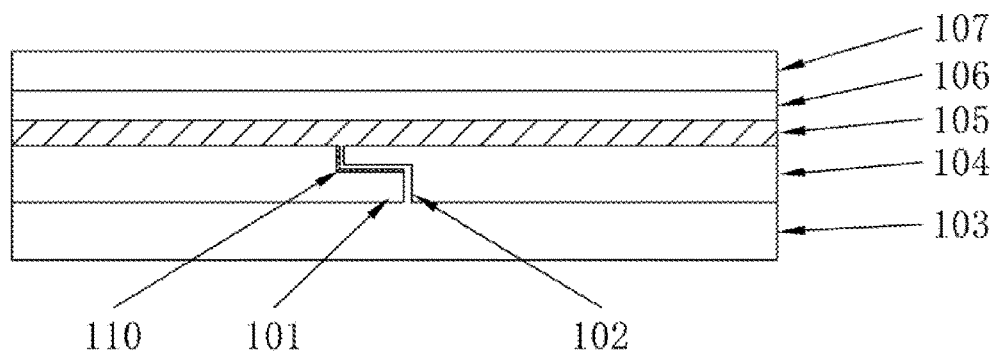
FIG. 1 is a schematic structural diagram of a display device according to an embodiment of the present disclosure.

The following description of various embodiments of the present disclosure with reference to the accompanying drawings is used to illustrate specific embodiments that can be practiced. Directional terms mentioned in the present disclosure, such as "above", "below", "front", "rear", "left", "right", "inside", "outside", "side", are merely used to indicate the direction of the accompanying drawings. Therefore, the directional terms are used for illustrating and understanding the present disclosure rather than limiting the present disclosure. In the figures, elements with similar structures are indicated by the same reference numerals.

The present invention can solve the defects, in current lamp panel assemblies, of warpage, breakage, and uneven light mixing at joints of lamp panels caused by instability of the joints of the lamp panels.

The present disclosure provides a lamp panel assembly comprising a plurality of mutually spliced lamp panels. A connecting portion is formed between any two adjacent lamp panels and comprises a convex portion and a concave portion.

The convex portion and the concave portion respectively disposed on the two adjacent lamp panels and fitted to each other.

Figure 2:
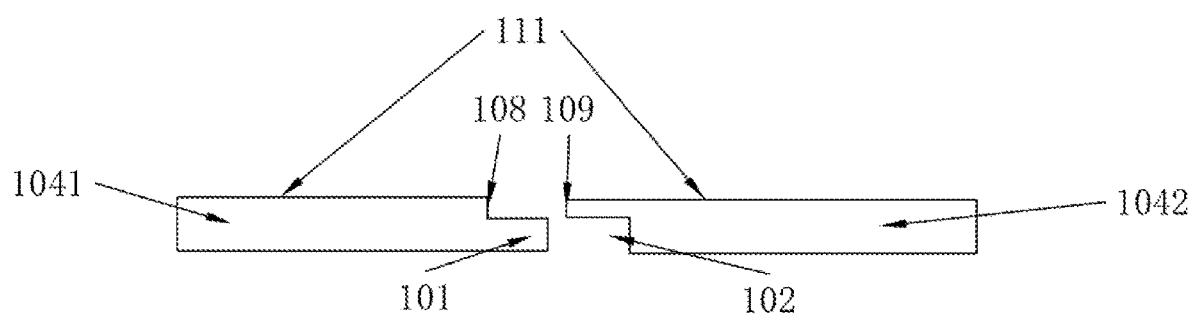
FIG. 2 is a schematic structural diagram of a connecting portion between lamp panels according to an embodiment of the present disclosure.

Please refer to FIG. 2, which shows a connecting portion between lamp panels according to an embodiment of the present disclosure. A connecting portion is formed between a lamp panel 1041 and a lamp panel 1042. The connecting portion comprises a convex portion 101 disposed the lamp panel 1041 and a concave portion 102 disposed the lamp panel 1042.

The convex portion 101 is fitted into the concave portion 102, that is, the convex portion 101 can be inserted into or embedded in the concave portion 102.

In an implementation, during splicing processes of lamp panel assemblies, lamp panels need to be spliced compactly to reduce splicing gaps. In this embodiment, the convex portion and the concave portion are respectively disposed on the two adjacent lamp panels. Engaging force between the convex portion and the concave portion enables the lamp panels to support each other to form a stable splicing structure. Therefore, the lamp panels can withstand greater squeezing force between them. Furthermore, a splicing gap is reduced, thereby reducing dark lines formed between the lamp panels due to uneven light mixing.

Furthermore, in this embodiment, each of the lamp panels is provided with the convex portions and the concave portions.

Two opposite sides of each of the lamp panels are first connecting surfaces provided with the convex portions, and other two opposite sides of each of the lamp panels are second connecting surfaces provided with the concave portions.

Figure 3:
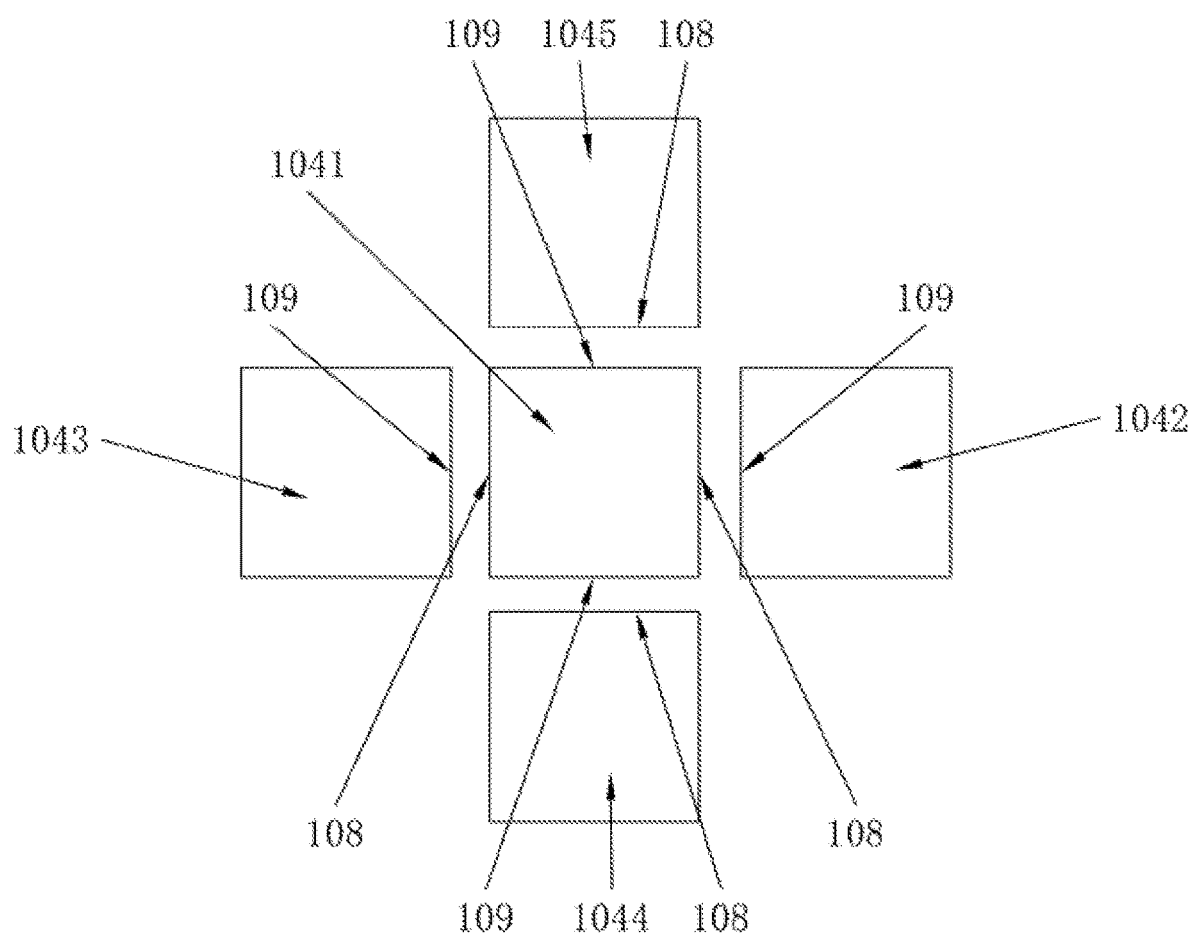
FIG. 3 is a schematic structural diagram of a lamp panel assembly according to an embodiment of the present disclosure.

Please refer to FIG. 2 and FIG. 3, which illustrate the lamp panel 1041, the lamp panel 1042, a lamp panel 1043, a lamp panel 1044, and a lamp panel 1045 according to this embodiment. The lamp panel 1041 is taken as an example for illustration.

The lamp panel 1041 is provided with the convex portions 101 and the concave portions 102. Two opposite sides of each of the lamp panels are first connecting surfaces 108, and other two opposite sides of each of the lamp panels are second connecting surfaces 109. The convex portions 101 are disposed on the first connecting surfaces 108, and the concave portions 102 are disposed on the second connecting surfaces 109. The lamp panel 1042, the lamp panel 1043, the lamp panel 1044, and the lamp panel 1045 are the same structure as the lamp panel 1041.

Specifically, the lamp panel 1041 is in the middle of the other four lamp panels disposed around and adjacent to the lamp panel 1041. The two first connecting surfaces 108 of the lamp panel 1041 face the second connecting surfaces 109 of the lamp panel 1042 and the lamp panel 1043, respectively. The two second connecting surfaces 109 of the lamp panel 1041 face the first connecting surfaces 109 of the lamp panel 1042 and the lamp panel 1043, respectively.

The four sides of the lamp panel 1041 are engaged with four adjacent lamp panels. That is, the convex portions 101 on the opposite sides of the lamp panel 1041 are engaged with the concave portions 102 of the lamp panel 1042 and the lamp panel 1043, and the concave portions 102 on the opposite sides of the lamp panel 1041 are engaged with the convex portions 101 of the lamp panel 1044 and the lamp panel 1045.

Similarly, splicing structures around the lamp panel 1042, the lamp panel 1043, the lamp panel 1044, and the lamp panel 1045 are the same as that around the lamp panel 1041, and will not be described in detail herein.

The force experienced by the lamp panel 1041 in the lamp panel assembly is symmetrical such that a stable splicing structure will be formed around the lamp panel 1041 during a splicing process. This prevents warpage, unevenness, breakage, etc. of the lamp panels at their joints when the lamp panel assembly is spliced.

In this embodiment, as shown in FIG. 2, each of the lamp panels is provided with a light emitting surface 111 connected to the first connecting surfaces 108 and the second connecting surfaces 109. Each convex portion 101 is disposed at an end of each first connecting surface 108 away from the light emitting surfaces 111. Each concave portion 102 is disposed at an end of each second connecting surface 109 away from the light emitting surfaces 111.

In an implementation, the convex portions 101 and the concave portions 102 are away from the light emitting surfaces 111, that is, not appearing on a plane where the light emitting surface 111 is located. Therefore, neither the convex portions 101 nor the concave portions 102 change structures and shapes of the light emitting surfaces 111, and does not increase gaps between adjacent lamp panels.

Figure 4:
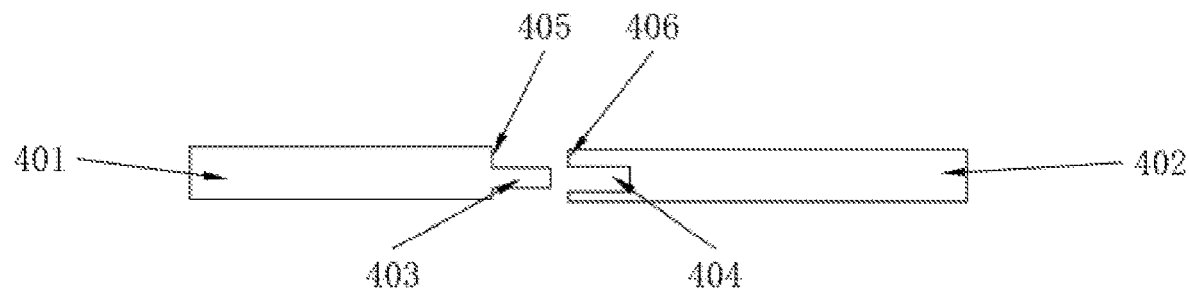
FIG. 4 is a schematic structural diagram of a connecting portion between lamp panels according to another embodiment of the present disclosure.

In another embodiment of the present disclosure, as shown in FIG. 4, a connecting portion is formed between two adjacent lamp panels 401 and 402. The connecting portion comprises a convex portion 403 disposed the lamp panel 401 and a concave portion 404 disposed the lamp panel 402. The convex portion 403 is fitted into the concave portion 404.

A side of the lamp panel 401 on which the convex portion 403 is disposed is a first connecting surface 405. A side of the lamp panel 402 on which the concave portion 404 is disposed is a second connecting surface 406. The convex portion 403 is disposed at a middle portion of the first connecting surface 405. The concave portion 404 is disposed at a middle portion of the second connecting surface 406. The convex portion 403 can be inserted into the concave portion 404 to form a stable splicing structure.

In this embodiment, as shown in FIG. 2, lengths of the convex portions 101 and the concave portions 102 in a thickness direction of each lamp panel are less than a thickness of each lamp panel.

That is, a length of the convex portion 101 in a thickness direction of the lamp panel 1041 is less than a thickness of the lamp panel 1041, and a length of the concave portion 102 in a thickness direction of the lamp panel 1042 is less than a thickness of the lamp panel 1042.

The thicknesses of the lamp panels in the lamp panel assembly are equal.

Therefore, a splicing structure composed of the convex portion 101 and the concave portion 102 is hidden under the light emitting surface 111, and does not change the structure of the light emitting surface 111, and does not increase the splicing gap at the joint.

The length of the convex portion 101 in a direction parallel to the light emitting surface 111 and the first connecting surface 108 is equal to a length of a side of the light emitting surface 111 connected to the first connecting surface 108.

The length of the concave portion 102 in a direction parallel to the light emitting surface 111 and the second connecting surface 109 is equal to a length of a side of the light emitting surface 111 connected to the second connecting surface 109.

In this way, force acting between the convex portion 101 and the concave portion 102 can be maximized.

Furthermore, a distance at which the convex portion 101 protrudes outward from the first connecting surface 108 is less than a distance at which the concave portion 109 is recessed from the second connecting surface 109. When the convex portion 101 is fitted into the concave portion 102, a gap is left between the convex portion 101 and the concave portion 102. Therefore, the light emitting surfaces 111 of the lamp panel 1041 and the lamp panel 1042 can be more compact at their joint, and the splicing gap between the lamp panel 1041 and the lamp panel 1042 can be minimized.

More specifically, the distance at which the convex portion 101 protrudes outward from the first connecting surface 108 is less than the distance at which the concave portion 109 is recessed from the second connecting surface 109 by 0.01 mm to 1 mm.

In this embodiment, as shown in FIG. 1, a surface of the convex portion 101 contacted to the concave portion 102 is coated with white ink 110. Because reflectance of the white ink 110 is up to 90%, coating the white ink 110 at a joint can increase reflectance at the joint, thereby increasing a degree of light mixing at the joint and improving uneven brightness. Please refer to FIG. 2, both the first connecting surface 108 and the second connecting surface 109 may be provided with the white ink 110 to enhance a degree of light mixing at the joint of the lamp panels.

In this embodiment, as shown in FIG. 2, the convex portion 101 is shaped as a cuboid, and the concave portion 102 is shaped as a cuboid corresponding thereto.

Figure 5:
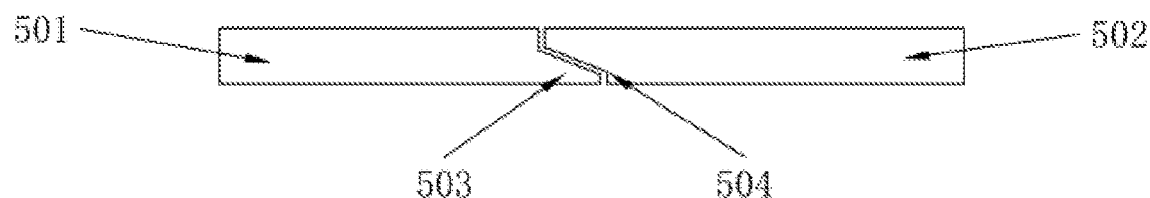
FIG. 5 is a schematic structural diagram of a connecting portion between lamp panels according to another embodiment of the present disclosure.

Please refer to FIG. 5, which shows a lamp panel 501 and a lamp panel 502. The lamp panel 501 is provided with a convex portion 503. The lamp panel 502 is provided with a concave portion 504. The convex portion 503 is fitted into the concave portion 504.

The convex portion 503 is shaped as a beveled body. The structure of the concave portion 504 corresponds to that of the concave portion 504 such that the convex portion 503 can be inserted into the concave portion 504.

Figure 6:
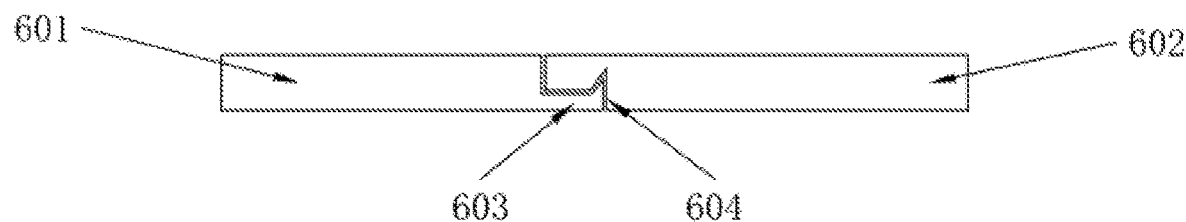
FIG. 6 is a schematic structural diagram of a connecting portion between lamp panels according to another embodiment of the present disclosure.

Please refer to FIG. 6, which shows a lamp panel 601 and a lamp panel 602. The lamp panel 601 is provided with a convex portion 603. The lamp panel 602 is provided with a concave portion 604. The convex portion 603 is fitted into the concave portion 604.

The convex portion 603 is a combination of a cuboid and a beveled body. The structure of the concave portion 604 corresponds to that of the concave portion 604 such that the convex portion 603 can be inserted into the concave portion 604.

In the above three embodiment, stable splicing structures can be formed, which ensures stability of spliced lamp panels.

Furthermore, the lamp panel assembly further comprises an outer frame in which the plurality of mutually spliced lamp panels are disposed. The lamp panels connected to the outer frame are external lamp panels. The same connecting portions are formed between the external lamp panels and the outer frame.

Each of the connecting portions comprises the convex portion and the concave portion.

In an embodiment, the outer frame is provided with the convex portions, and the external lamp panels are provided with the concave portions. The convex portions are fitted into the concave portions.

In another embodiment, the outer frame is provided with the concave portions, and the external lamp panels are provided with the convex portions. The convex portions are fitted into the concave portions.

In another embodiment, the concave portions are disposed on parts of the outer frame corresponding to the external lamp panels provided with the convex portions, and the convex portions are disposed on parts of the outer frame corresponding to the external lamp panels provided with the concave portions.

The outer frame is connected to the external lamp panels by fitting the convex portions and the concave portions so that the lamp panels can be stably installed in the outer frame after splicing.

Please refer to FIG. 1, the present disclosure further provides a display device comprising a backplate 103, a lamp panel assembly 104, a light emitting device layer 105, an optical film 106, and a display screen 107.

The lamp panel assembly 104 is disposed on the backplate 103. The lamp panel assembly 104 is spliced in the manner described in the above embodiments. The light emitting device layer 105 is disposed on the lamp panel assembly 104. The light emitting device layer 105 comprises white ink, light emitting diodes (LEDs), and a phosphor coating. The optical film 106 and the display screen 107 are sequentially disposed on the light emitting device layer 105.

In this embodiment, the display device comprises the aforementioned lamp panel assembly which is spliced by fitting the convex portions and the concave portions. This ensures the stability of the joints, thereby preventing the joints from warpage, unevenness and breakage. And, this ensures that the phosphor coating will not break due to the instability of the spliced lamp panels. Further, this reduces the gaps at the joints, thereby preventing the joints of the lamp panels from forming the dark lines caused by the uneven light mixing and improving the uneven light mixing of the lamp panel assembly.

In the above, the present application has been described in the above preferred embodiments, but the preferred embodiments are not intended to limit the scope of the present application, and those skilled in the art may make various modifications without departing from the scope of the present application. The scope of the present application is determined by claims.

What is claimed is:

1. A lamp panel assembly, comprising: a plurality of mutually spliced lamp panels, wherein a connecting portion is formed between any two adjacent lamp panels and comprises a protruding portion and a receiving portion respectively disposed on the two adjacent lamp panels and fitted to each other, and surfaces of the protruding portions contacting the receiving portions are coated with white ink.

2. The lamp panel assembly according to claim 1, wherein each of the lamp panels is provided with the protruding portions and the receiving portions.

3. The lamp panel assembly according to claim 2, wherein two opposite sides of each of the lamp panels are first connecting surfaces provided with the protruding portions, and other two opposite sides of each of the lamp panels are second connecting surfaces provided with the receiving portions.

4. The lamp panel assembly according to claim 3, wherein each of the lamp panels is provided with a light emitting surface connected to the first connecting surfaces and the second connecting surfaces; and
   wherein each protruding portion is disposed at an end of each first connecting surface away from the light emitting surfaces, and each receiving portion is disposed at an end of each second connecting surface away from the light emitting surfaces.

5. The lamp panel assembly according to claim 3, wherein lengths of the protruding portions and the receiving portions in a thickness direction of each lamp panel are less than a thickness of each lamp panel.

6. The lamp panel assembly according to claim 3, wherein a distance at which each protruding portion protrudes outward from each first connecting surface is less than a distance at which each receiving portion is recessed from each second connecting surface.

7. The lamp panel assembly according to claim 1, further comprising an outer frame in which the plurality of mutually spliced lamp panels are disposed, wherein the lamp panels connected to the outer frame are external lamp panels, and the same connecting portions are formed between the external lamp panels and the outer frame.

8. The lamp panel assembly according to claim 1, wherein the protruding portions are shaped as cuboids, beveled bodies, or combinations thereof.

9. A display device, comprising: a backplate, a lamp panel assembly, an optical film, and a display screen, wherein
   the lamp panel assembly, the optical film, and the display screen are disposed in sequence on the backplate;
   the lamp panel assembly comprises a plurality of mutually spliced lamp panels;
   a connecting portion is formed between any two adjacent lamp panels and comprises a protruding portion and a receiving portion respectively disposed on the adjacent two lamp panels and fitted to each other; and
   surfaces of the protruding portions contacted to the receiving portions are coated with white ink.

10. The display device according to claim 9, wherein each of the lamp panels is provided with the protruding portions and the receiving portions.

11. The display device according to claim 10, wherein two opposite sides of each of the lamp panels are first connecting surfaces provided with the protruding portions, and other two opposite sides of each of the lamp panels are second connecting surfaces provided with the receiving portions.

12. The display device according to claim 11, wherein each of the lamp panels is provided with a light emitting surface connected to the first connecting surfaces and the second connecting surfaces, each protruding portion is disposed at an end of each first connecting surface away from the light emitting surfaces, and each receiving portion is disposed at an end of each second connecting surface away from the light emitting surfaces.

13. The display device according to claim 11, wherein each protruding portion is disposed at a middle portion of each first connecting surface and each receiving portion is disposed at a middle portion of each second connecting surface.

14. The display device according to claim 12, wherein, in each of the lamp panels, lengths of the protruding portions in a direction parallel to the light emitting surface and the first connecting surfaces are equal to lengths of sides of the light emitting surface connected to the first connecting surface, and lengths of the receiving portions in a direction parallel to the light emitting surface and the second connecting surfaces are equal to lengths of sides of the light emitting surface connected to the second connecting surface.

15. The display device according to claim 11, wherein lengths of the protruding portions and the receiving portions in a thickness direction of each lamp panel are less than a thickness of each lamp panel.

16. The display device according to claim 11, wherein a distance at which each protruding portion protrudes outward from each first connecting surface is less than a distance at which each receiving portion is recessed from each second connecting surface.

17. The display device according to claim 9, further comprising an outer frame in which the plurality of mutually spliced lamp panels are disposed, wherein the lamp panels connected to the outer frame are external lamp panels, and the same connecting portions are formed between the external lamp panels and the outer frame.

18. The display device according to claim 9, wherein the protruding portions are shaped as cuboids, beveled bodies, or combinations thereof.

* * * * *